(12) United States Patent
Blanc et al.

(10) Patent No.: US 8,099,191 B2
(45) Date of Patent: Jan. 17, 2012

(54) ROBOT SERVICE SYSTEM AND A METHOD FOR PROVIDING REMOTE SERVICE FOR A ROBOT

(75) Inventors: Dominique Blanc, Västerås (SE); Mats Myhr, Västerås (SE); Peter J. Eriksson, Västerås (SE); Steve Murphy, Hovåas (SE)

(73) Assignee: ABB Research Ld., Zürich (CH)

( * ) Notice: Subject to any disclaimer, the term of this patent is extended or adjusted under 35 U.S.C. 154(b) by 625 days.

(21) Appl. No.: 12/330,259

(22) Filed: Dec. 8, 2008

(65) Prior Publication Data

US 2009/0157224 A1 Jun. 18, 2009

(30) Foreign Application Priority Data

Dec. 6, 2007 (EP) .................................... 07122449

(51) Int. Cl.
*G06F 19/00* (2011.01)
(52) U.S. Cl. ....................... 700/245; 700/250; 700/253
(58) Field of Classification Search .................. None
See application file for complete search history.

(56) References Cited

U.S. PATENT DOCUMENTS

| | | | |
|---|---|---|---|
| 5,038,088 A | 8/1991 | Arends et al. | |
| 5,445,347 A * | 8/1995 | Ng ............................. | 246/169 R |
| 5,566,092 A * | 10/1996 | Wang et al. ................... | 702/185 |
| 6,294,755 B1 | 9/2001 | Sawatzky et al. | |
| 6,326,758 B1 * | 12/2001 | Discenzo ....................... | 318/609 |
| 6,574,672 B1 * | 6/2003 | Mitchell et al. ............... | 709/250 |
| 6,882,962 B2 * | 4/2005 | Aoyama ......................... | 702/185 |
| 7,054,716 B2 * | 5/2006 | McKee et al. ................. | 700/245 |
| 7,127,325 B2 | 10/2006 | Nagata et al. | |
| 7,826,984 B2 * | 11/2010 | Sjostrand et al. ............... | 702/34 |
| 7,882,394 B2 * | 2/2011 | Hosek et al. ..................... | 714/26 |
| 2002/0156542 A1 * | 10/2002 | Nandi .............................. | 700/30 |
| 2004/0010344 A1 | 1/2004 | Hiratsuka et al. | |
| 2005/0144620 A1 | 6/2005 | Hada et al. | |

FOREIGN PATENT DOCUMENTS

| | | |
|---|---|---|
| DE | 102006017945 A1 | 12/2006 |
| EP | 1376284 A1 | 1/2004 |
| EP | 1535706 A1 | 6/2005 |
| EP | 1857897 A1 | 11/2007 |
| WO | WO-97/27978 A1 | 8/1997 |

OTHER PUBLICATIONS

European Search Report—Feb. 15, 2008.

* cited by examiner

*Primary Examiner* — Khoi Tran
*Assistant Examiner* — Bhavesh V Amin
(74) *Attorney, Agent, or Firm* — Venable LLP; Eric J. Franklin

(57) ABSTRACT

A robot service system including a robot including least one manipulator and a controller controlling the motion of the manipulator. A remote service center includes an analyzing computer, and a communication line between the robot controller and the remote service center. A monitoring component is configured to monitor the current operation of the controller and the current motions of the manipulator, and to transmit information on the current operation of the controller and the current motions of the manipulator to the remote service center. The analyzing computer is configured, upon request, to calculate new maximum permissible performance parameters for the robot based on the received information and to transmit the new maximum permissible performance parameters to the robot controller. The analyzing computer is further configured to calculate one or more monitoring parameter, and the monitoring component is further configured to supervise that the robot is not run outside allowed limits based on the monitoring parameters.

18 Claims, 2 Drawing Sheets

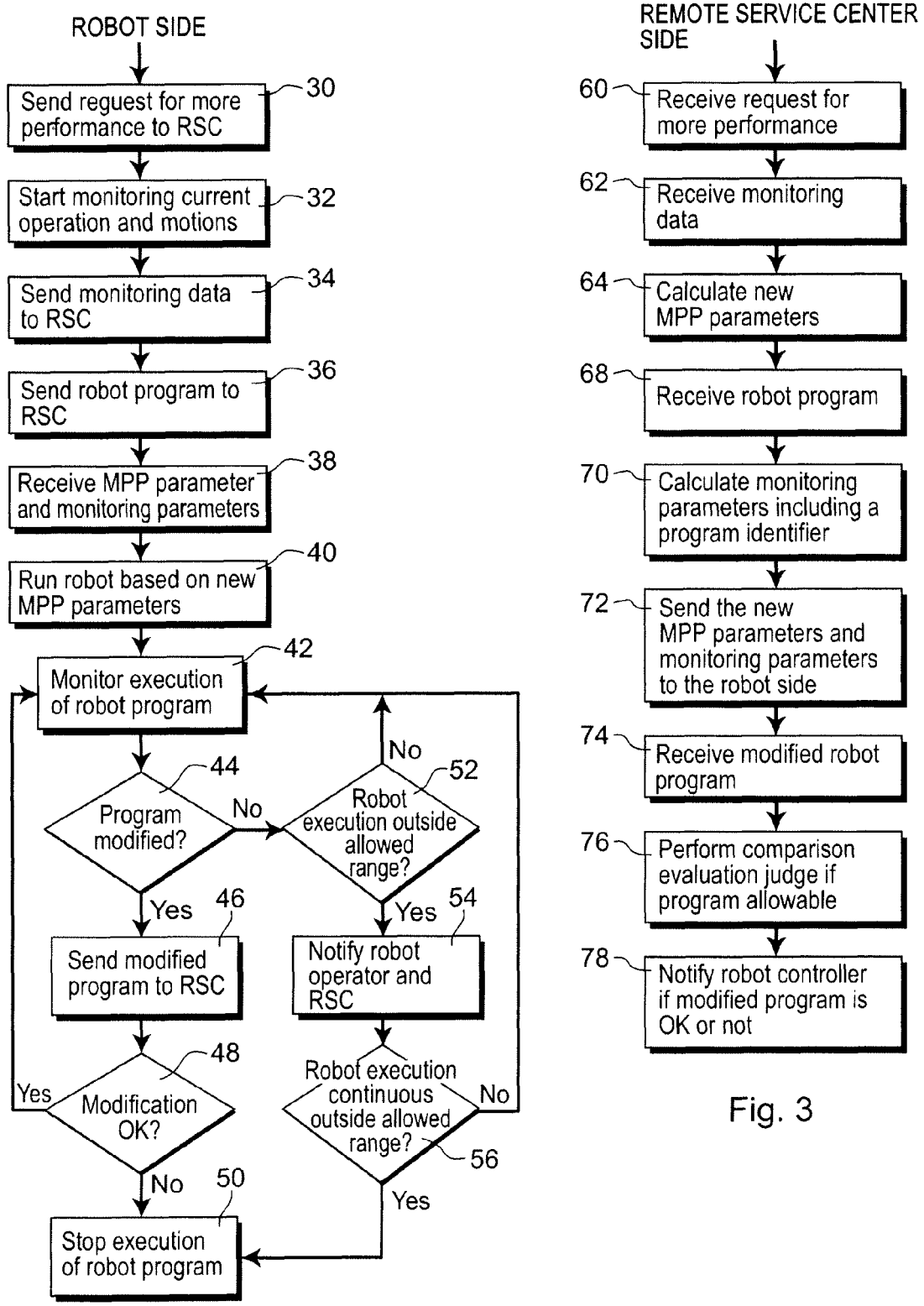

ROBOT SERVICE SYSTEM AND A METHOD FOR PROVIDING REMOTE SERVICE FOR A ROBOT

CROSS-REFERENCE TO RELATED APPLICATIONS

This application claims priority to European patent application 07122449.7 filed 6 Dec. 2007.

FIELD OF THE INVENTION

The present invention relates to a robot service system comprising industrial robot including least one manipulator and a controller controlling the motion of the manipulator, a remote service center including an analyzing computer, and a communication line between the robot controller and the remote service center.

The invention also relates to a method for providing remote service for one or more industrial robots.

PRIOR ART

Up until recently, robots have been isolated once delivered from the manufacture to the field. However, it has been proposed to provide remote services and assistance of the robots at a centralized service center. The robots are connected to the service center via a network that allows for backups, control and remote assistance and diagnostics. For example, patent application US20050144620A1 discloses a software downloading system whereby a robot is connected via an electrical communication line to a database, and where the position of the robot is used to determine the allowable software to be downloaded.

Patent application US20040010344A1 describes a system for remote control of a robot over a communication network using a connection device on the robot side.

U.S. Pat. No. 7,127,325B2 describes a system where a diagnostic computer is connected to the robot and data is sent to a remote system for simulation and adjustment of control parameters in the robot controller. For example, the servo gain is adjusted.

These systems help the customer in many ways, but mostly "after the fact", i.e. when a problem has occurred, and only really cover the maintenance and control aspects of a robot controller in the field.

There are many additional problems faced by the customers when a robot is commissioned and put into service in the field. These problems traditionally have required a large number of phone calls, letters and communications between the customer and the robot manufacture. A typical problem faced by the customer is that the robot has been installed and programmed, but the cycle time is too slow for the present application. For the given motion, it is possible to get more capacity from the robot, but this capacity cannot be utilized as this would violate the guarantee of the robot, such as the guarantee of the lifetime of the robot.

There are many control parameters that affect the robot performance. These parameters are chosen for worst-case or close to worst-case scenarios in order to ensure the robot lifetime. The lifetime of an industrial robot is determined by how its mechanical structure and its components are loaded during the movements carried out by the robot during its lifetime. The mechanics of robots of today are dimensioned such that the robot is to be able to carry out the severest conceivable movement pattern during the whole of its specified lifetime. Only few robots are run with such movement programs, and therefore almost all robots of today are mechanically oversized in relation to the specified lifetime. To pre-vent the loads on the mechanical components of the robot from becoming too high, limits to maximum permissible torque and speed for each one of the axes of the robot are set as well as limits to the calculated stresses in the robot mechanical structure. These limits are set prior to delivery of the robot.

The limits to the maximum permissible axis torques and axis speeds are calculated based on the guaranteed lifetime of the robot and fatigue diagrams for the mechanical structure. The calculation starts from a worst conceivable case with abnormal movement patterns and with an abnormal number of cycles per unit of time. Thus, the robot has a much greater capacity than is normally utilized. The mechanical loads on the mechanical components at a certain time depend on several different factors, for example the speed, acceleration, configuration, and load of the robot. This means that if the robot has an advantageous configuration, a small load, or is running a nicer cycle, for example with lower top speeds, the limits set to the maximum permissible axis torque and axis speed may be exceeded without the load of the components becoming too high. This is described in patent specification EP0877660B1.

Another typical problem faced by the customer is that the robot has been installed and programmed, but the load is outside the load diagram for the worst case. The customer believes that the load is okay with the actual motion, but the customer must write to the manufacturer and get an approval for this specific motion. This takes time and slows down the installation process. In addition, the customer may reprogram the program and violate the motion limitation and the agreement.

A further problem is that the customer may find an error message on the display unit of the robot controller. The text on the display unit is limited and the customer does not have the experience to understand fully what to do. Currently, the customer must call an expert, or find the manual and spend time reading about the possible causes.

A further problem is that the customer needs to make a small batch run with the robot controller and to be able to do this needs to use an optional feature of the controller. As the feature costs money, the customer would first have to purchase the new option and then install the option, which would take time and direct costs. As a batch is small, the customer would like to use the option only temporarily and then pay per use. Similarly, the customer might decide to permanently purchase a new option for the controller. This occurs frequently during the installation and commissioning phase, when the programmers of the customer realize that they have missed an option when the robot was ordered. This currently takes a great deal of time and is a complicated process and significantly delays the installation commissioning.

OBJECTS AND SUMMARY OF THE INVENTION

The object of the present invention is to alleviate one or more of the above-mentioned problems and to provide improved remote services and assistance of the robot.

According to one aspect of the invention, this object is achieved by a robot service system.

Such a robot service system comprises a robot including a manipulator and a controller controlling the motion of the manipulator, a remote service center including an analyzing computer, a communication line between the robot controller and the remote service center, a monitoring component configured to monitor the current operation of the controller and the current motions of the manipulator, and to transmit information on the current operation of the controller and the current motions of the manipulator to a remote service center. The analyzing computer is configured, upon request, to calculate new maximum permissible performance parameters for the robot based on the received information and to transmit the new maximum permissible performance parameters to the robot controller. The analyzing computer is further configured to calculate one or more monitoring parameters and the monitoring component is configured to supervise that the robot is not run outside allowed limits based on the monitoring parameters.

When the customer wants to improve the operation of the robot, by running the robot outside allowed limits with regard to the guarantee of the robot lifetime, the customer only has to send a request to the remote service center requesting the improved operation of the robot. Monitoring is automatically established for the current motion of the robot, and an evaluation of the request is performed at the remote service center. If the request is allowed, new maximum performance parameters are calculated and sent back to the robot controller. The new maximum permissible performance parameters are, for example, maximum permissible axis torque and maximum permissible axis speed for the axes of the robot. At the same time one or more monitoring parameters are calculated and sent back to the controller or to the monitoring component. The monitoring parameters include information that makes it possible to supervise that the robot program is not modified and the robot is not run outside allowed limits. The service center activates the monitoring component, which starts monitoring the actual execution of the robot based on the monitoring parameters. For example, if the program is modified the monitoring component will notice the modification and can inform the remote service center.

The invention makes it possible for the customer to utilize the whole capacity of the robot for a specific motion case, and further makes it possible for the manufacturer to supervise that the increased capacity is utilized only for this specific motion case, and for no other motion cases. The invention reduces the communication needed between the robot operator and the personnel at the service center. The invention makes it easy and fast to request and receive increased performance of the robot.

According to an embodiment of the invention, the analyzing computer is configured, upon a request for more performance, to calculate new maximum permissible performance parameters including maximum torque for the axes of the manipulator, maximum gearbox torque, and maximum mechanical structure stress. Preferably, the maximum permissible performance parameters also include maximum temperature of the mechanics of the robot and maximum temperature of the electronics in the drive train. In order to be able to decide whether more performance is allowed for a certain robot program, the robot program is sent to the remote service center. The analyzing computer is configured to perform an automatic analysis of the program. If the analysis reveals that the present motion of the robot allows increased performance, new maximum permissible performance parameters are calculated. This embodiment makes it easy for the customer to increase the performance of the robot, such as shorten the cycle time, for a certain robot program.

The customer is only allowed to use the new maximum permissible performance parameters for this specific robot program. Accordingly, the customer is not allowed to modify the robot program without receiving a new allowance for the modified program. Therefore, a monitoring parameter, which is a unique identifier for the robot program, is calculated. For example, a check sum is calculated based on the program code. The check sum is returned to the robot controller together with the robot program. The monitoring component supervises, during execution of the robot program, that the program is not modified or tampered with by comparing the check sum of the executed program with the check sum received from the remote service center. This embodiment makes it possible for the manufacture of the robot to supervise that a robot program, which has been allowed increased performance outside limits set upon delivery of the robot, is not modified or tampered with by the customer and thus that the agreement is kept.

According to an embodiment of the invention, the analyzing computer is configured, upon a request for more load, to calculate new maximum permissible performance parameters including maximum torque for the motors of the axis of the robot and maximum gearbox torque. Preferably, the new maximum permissible performance parameters also include, maximum mechanical structure stress, and maximum temperature of the mechanics of the robot and electronics in the drive train. The request for more load not only includes different motion parameters, but also a set of new monitoring parameters. In this case, the monitoring parameters include allowed joint ranges for one or more axes of the robot, and the monitoring component is configured to supervise that the axes are not moved outside the allowed joint ranges. In particular, for a six-axis robot a restriction is added to the fifth axes of the robot, so that the torque due to gravity does not exceed the ability of the motor driving the axis or the brake braking the motor.

Values for the joint ranges are sent to the monitoring component, which sets up a check of the axes to be supervised on periodic bases. If the axes are moved outside the allowable ranges, the monitoring component may respond by stopping the robot and sending a message to the operator of the robot. This embodiment makes it possible for the customer to receive a fast approval on a request for increasing the load carried by the robot, and makes it possible for the manufacture to supervise that the robot is not run with the new approved load during another robot motion, which has not been approved by the service center.

According to an embodiment of the invention, the robot comprises a help component configured, upon activation, to provide a user interface to the remote service center. The help component provides a user interface to the service center and connects to the service center when there is a need on the robot side. The service center is provided with personnel who approve services, such as pay per use, option downloads, software downloads, extra performance, and who are online when help is needed directly on the controller. This embodiment makes it quick and easy for the robot operator to come into contact with the service center and request help. The service center also includes knowledge bases and automatic problem lookup services where the system may automatically lookup additional information or solutions to the existing problem.

According to an embodiment of the invention, the help component comprises a help button, the robot comprises a portable control unit, also called a teach pendant unit, including a display and the help component. The help component is configured to show the user interface on the display upon activation of the help button, and to connect the control unit to the remote service center. This embodiment provides a help button on the portable control unit. When the user activates the help button, an interface to the remote service center is displayed on the display of the teach pendant unit and a connection is made between the control unit and the remote service center. Thereby, it is possible for the user to communicate directly with the remote service center and request help and ask for services.

According to another aspect of the invention, the object is achieved by a method.

Such a method comprises receiving a request for improved operation of the robot, transmitting information on the current operation of the controller and the current motions of the manipulator to a remote service center upon receiving the request, calculating new maximum permissible performance parameters for the robot based on the information, transmitting the new maximum permissible performance parameters to the robot controller, calculating one or more monitoring parameters, running the robot based on the new maximum permissible performance parameters, and supervising that the robot is not run outside allowed limits based on the monitoring parameters.

BRIEF DESCRIPTION OF THE DRAWINGS

The invention will now be explained more closely by the description of the different embodiments of the invention and with reference to the appended figures.

FIG. 2 shows a flow diagram illustrating an example of a method according to the invention on the robot side.

FIG. 3 shows a flow diagram illustrating an example of a method according to the invention on the service center side.

DETAILED DESCRIPTION OF PREFERRED EMBODIMENTS OF THE INVENTION

Figure 1:
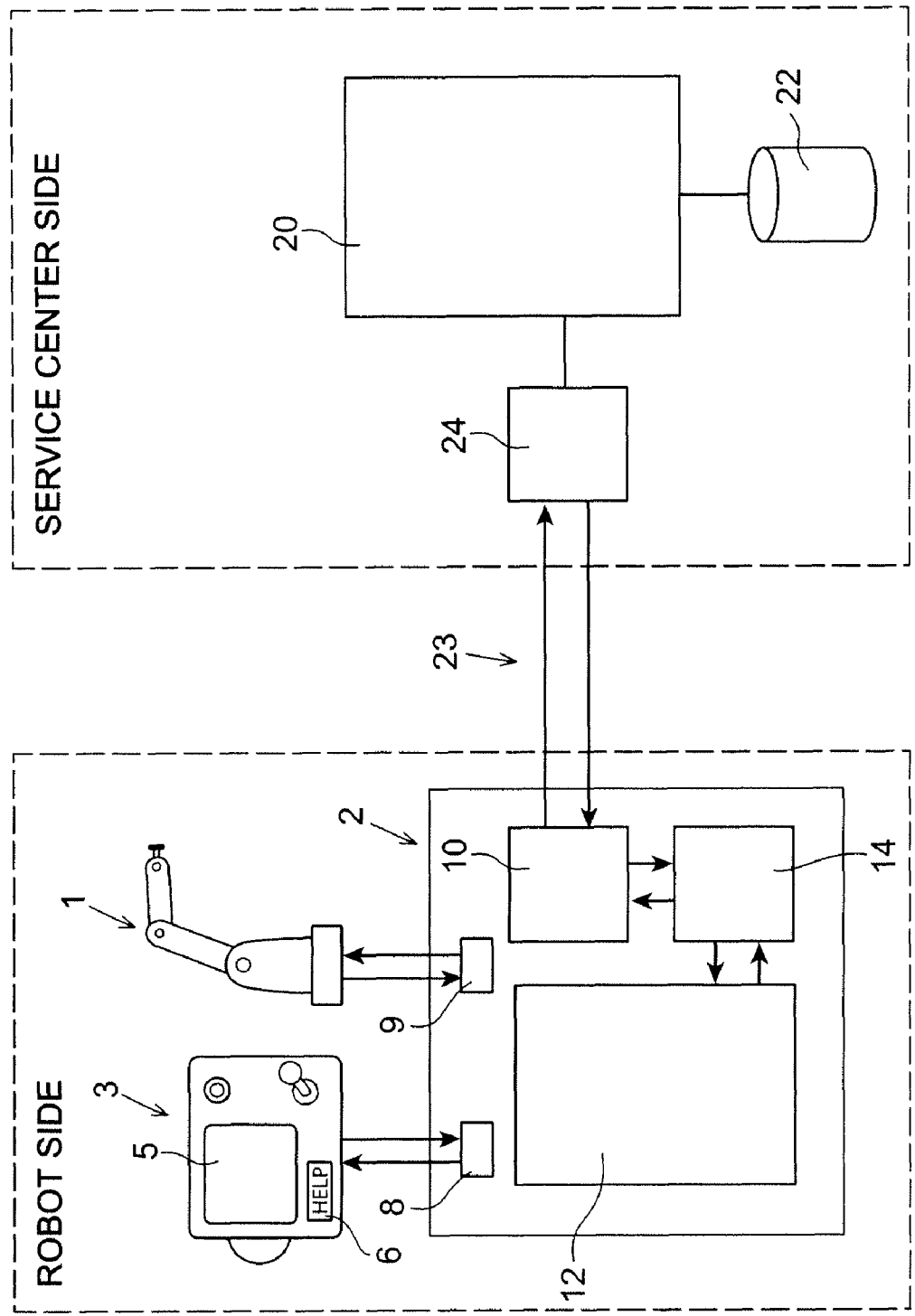
FIG. 1 shows a block scheme showing one embodiment of a robot service system according to the invention.

FIG. 1 shows an example of a robot service system according to the invention. The robot is located at the customer, in the following called the robot side of the system. A service center is located at a distance from the robot, for example at the manufacturer, in the following called the service center side of the system. The robot side and the service center side communicate with each other via a communication line.

The robot comprises a manipulator 1, a robot controller 2, and a portable control unit 3, in the following denoted a teach pendant unit. The invention is also applicable to a robot including a plurality of manipulators controlled by one robot controller. The manipulator 1 comprises a number of robot arms, which are movable in relation to each other about a plurality of movement axes, and a hand provided with a tool attachment. The robot hand is rotatable in two or three degrees of freedom relative to the arm supporting the hand. The robot controller 2 controls the position and orientation of the robot hand. For each of the movement axes of the robot, server equipment comprising a driving motor and a position sensor is provided. The position sensor delivers a signal, which is a measure of the angle of rotation of the axis in question. The server equipment of each axis is supplied with a reference value for the angle of rotation of the axis, and the driving motor of the axis brings the robot to move the axis in question until the axis position indicated by the position sensor of the axis coincides with the reference value supplied to the server system. To prevent the loads of the mechanical components of the manipulator, for example bearings, shafts, motor housings, and arm attachments, from becoming to high, limits to the maximum permissible torques and speeds for each one of the axes of the robots are set. During execution of the robot program it is supervised that the maximum permissible torque and maximum permissible speed of the axes are not exceeded.

A teach pendant unit 3 is used for teaching and manually operating the robot. The teach pendant unit normally comprises operator control means, for example a joystick and a set of control buttons, a visual display unit 5, and safety equipment, such as an emergency stop button and en enabling device. The teach pendant unit 3 is connected to the robot controller 2, either wirelessly or through a cable. According to an embodiment of the invention, the teach pendant unit 3 is provided with a help component including a help button 6. The help component is configured to provide the user with an interface to the remote service center upon activation of the help button. The help component is also configured to connect the user to a database of the service center, when there is a need on the robot side. The help button 6 provides direct online help from the remote service center. Alternatively, the help component is located in the robot controller. For example, after experiencing a problem on the controller, the user presses the help button 6 on the teach pendant unit. This initiates a connection to the remote service center. The controller is diagnosed and any additional information on the problem is sent to the controller for display on the teach pendant unit. Upon request, a service representative calls the customer's cell phone while the customer is in front of the robot.

The robot controller 2 is a standard industrial robot controller. Such a robot controller includes program memory for storing robot programs including movement instructions for the robot, a program executor for executing the movement instructions, and a path planner for planning robot paths based on the movement instructions and for generating control signals to drive units of the robot. The robot controller is further provided with communication equipment 8 for communicating with the teach pendant unit 3, communication equipment 9 for communicating with the manipulator 1, and communication equipment 10 for communicating with the remote service center. The communication equipment 10 provides basic communications from the robot controller to the remote service center, and includes means for receiving data and transmitting data. The communication equipment can either be built into the robot controller, or provided by hardware and software external to the controller. The communication between the robot controller and the remote service center can be any of plurality of communication means, such as Ethernet with TCP/IP, over the Internet, over GPRS, over e-mail, and SMS.

According to the invention, the robot side is provided with a monitoring component 14 configured to monitor the current operation of the controller and the current motions of the manipulator, and to transmit information on the current operation of the controller and the current motions of the manipulator to the remote service center. The monitoring component 14 is also configured to supervise that the robot is not run outside allowed limits based on monitoring parameters received from the remote service center. The monitoring component monitors the actions of the robot and ensures that it follows an agreement sent down from the service center with regard to, for example, performance and load capacity. It also monitors pay-per-use and updates the database of the service center with information over the communication line. The monitoring component can be built into the controller, as shown in FIG. 1, or be provided external to the controller, for example, in an external computer on the robot side, which computer communicates with the robot controller.

The remote service center comprises an analyzing computer 20 configured to receive data from the robot controller and to analyze the received data. A communication line 23 is established between the robot controller and the remote service center. The analyzing computer 20 is configured, upon request, to calculate new maximum permissible performance parameters for the robot based on received information on the current operation of the controller and current motions of the manipulator, including potentially the current program, and to transmit the new calculated maximum permissible performance parameter to the robot controller 2. The analyzing computer is also configured to calculate one or more monitoring parameters and transmit the monitoring parameters to the monitoring component 14. The monitoring component 14 is configured to supervise that the robot is not run outside allowed limits based on the received monitoring parameters.

Monitoring parameters are parameters monitored by the monitoring component in order to supervise that the robot program is not modified outside approved limits, and maximum permissible performance parameters are parameters used by the robot controller in order to plan and control the motion of the robot.

The service center may include one or more computers, a database 22, and personnel who approve services such as pay-per-use, option downloads, software downloads, extra performance and extra load, knowledge bases, problem databases, and are online when help is needed directly on the controller. The database 22 contains information on the robot, the customer, the options purchased, the usage and approved contacts and help services. The service center also comprises communication equipment 24 for communicating with the robot controller 2.

In general, the end customer has already entered into an agreement with the manufacture for services and has approved the communication line. An alternative embodiment is that the customer requests one of the possible services first, and then contacts the manufacture for payment. When the customer once temporarily makes use of an option provided by the service center, the customer requests an evaluation either from the teach pendant unit, which communicates with the service center via the robot controller, or calls a local representative, which connects up to the robot via the communication line. The necessary option is enabled remotely from the service center. Monitoring is established for use. At periodic intervals, or continuously, the use of the option is sent to the service center and logged in the database.

When the customer wants permanent use of a new option offered by the service center, the customer requests an evaluation either from the teach pendant unit or calls a local representative, which connects up to the robot controller via the communication link. The necessary option is enabled remotely from the service center and downloaded to the controller. A bill is sent from the service center to the customer or the customer has approved a credit card payment.

There are many control parameters that affect the robot performance. These parameters are chosen for worst-case or close to worst-case scenarios in order to ensure the robot lifetime. The robot has a much greater capacity than is normally utilized. If the customer is running a nicer cycle, for example with lower top speeds, than there is possible to allow an increase of the performance, for example increasing the allow-able acceleration or torque that the motors produce.

In the following, examples of maximum permissible performance parameters are described:

Maximum allowed torque in the motors; Normally, a larger torque than given by the manufacture would create heat up problems, but if the cycle has long rest periods, then the heat build up will not occur. Accordingly, if the analysis of the monitoring data shows that the cycle has long rest periods a new maximum allowed torque is calculated and sent to the robot controller.

Maximum allowable stress in the mechanical structure of the manipulator; Normally, the structure stress is controlled by the robot controller to a safe level for a worst-case lifetime. However, the allowable stress level can be increased for cycles that have been measured and approved, and then the robot will move faster.

Maximum allowable gearbox torque; Depending on the movements during the cycle, it is possible to increase the allowable gearbox torque.

Maximum allowed environmental temperature; Depending on the robot motion, it is possible to decrease the expected environmental temperature and to increase the cooling factors for the drive units and electronics of the robot, which allows greater currents and more efficient energy utilization.

FIG. 2 is shows an example of what happens on the robot side when a user asks for more performance, and FIG. 3 shows what happens on the service center side when the user asks for more performance. In this case the customer wants a shorter cycle time. The customer sends a request for more shorter cycle time to the remote service center (RSC), either from the teach pendant unit, for example by activating the help button 6, or calls the local representative at the remote service center who connects up to the robot via the communication line, block 30. When a request for more performance is sent to the remote service center, the monitoring component 14 is activated and starts monitoring the actual execution of the robot for the desired program cycle. Ranges and values of temperatures, joint ranges of the robot axes, accelerations, stresses, etcetera are saved by the monitoring component. The monitoring is continued at least during one robots cycle, preferably during two or more cycles, block 32. Examples of monitoring data for the current operation of the controller are: maximum temperature of the drive units of the robot and maximum current of drive unit during the cycle. Examples of monitoring data for the motions of the robot are positions, velocities, and acceleration of the robot axes. The monitoring data is sent to the remote service center, block 34. Further, the robot program, for which more performance is requested and which was executed during the monitoring of the controller, is sent to the remote service center (RCS), block 36.

The remote service center receives the request for more performance, block 60, and the monitoring data from the robot controller, block 62. The analyzing computer performs an evaluation whether it is possible to allow another set of maximum permissible performance parameters (MPP) based on the duty cycle and stress calculations using the monitoring data and program data. New maximum permissible performance parameters are calculated based on the monitoring data, the block 64. Given these new parameters, an approximate cycle time reduction is calculated and the new maximum permissible performance parameters can be sent back to the controller and the teach pendant unit. Examples of maximum permissible performance parameters are maximum allowed motor torque on the axis of the manipulator, maximum allowed gearbox torque, maximum allowed stress on the mechanical structure, and maximum allowed temperature.

The remote service center receives the robot program from the robot controller, block 68, and automatically analyzes the program, extracting the positions and sequences of the programmed points and comparing to the monitored data, and marks the program. The program is marked with a unique program identifier, for example a check sum calculated based on the program code. Then, using a common check sum hash algorithm it is possible to detect if the program is tampered with or modified. The analyzing computer calculates a set of monitoring parameters, such as point modification, temperature ranges, and expected duty cycles, block 70. One of the monitoring parameters is the program identifier. The new maximum permissible performance parameters and the monitoring parameters are sent to the robot side, block 72. The robot controller receives the maximum permissible performance parameters and the monitoring component receives and stores the monitoring parameters, block 38. The robot controller starts executing the robot program based on the new updated maximum permissible performance parameters, block 40.

During execution of the robot program, the monitoring component monitors the execution of the program with the given program identifier, block 42. The monitoring component checks whether the program is modified or not, block 44, based on the monitoring parameters, for example using a common check sum hash algorithm. If the program is modified, the check sum is changed. Accordingly, the monitoring component can use the check sum hash algorithm to detect if the program has been modified or not, block 44.

The program may be modified, since it is important to be able to modify a point or two a few millimeters. Via the check sum identifier of the program, the monitoring component knows that a program has been modified. The monitoring component continuous the monitoring, and informs the service center that the program has been modified and also sends a copy of the modified program to the service center, block 46. The service center receives the modified robot program, block 74, and performs a comparison evaluation, and judges whether the program is allowable or not with the given set of maximum permissible performance parameters, block 76. The remote service center notifies the robot side whether the modified program is allowed or not, to be executed with the present set of maximum permissible performance parameters, block 78. If the program is allowable, the monitoring component continuous to monitor the given set of performance parameters, block 48, 42. If the modified program is not allowable, then a notification is sent to the robot controller and the monitoring component sets up a message on the robot display device notifying the user that the program modification is not allowable. The monitoring component can either stop the execution of the robot program immediately upon receiving the notification that the program modification is not allowable, or send warnings to the user and shut off the execution of the robot program after a number of cycles, which are determined by the service center, block 50.

If the monitoring component notice that the execution of the robot program is outside allowed ranges given by the monitoring parameters, block 52, the robot operator can be notified, for example, by displaying a message on the display device. A message is also sent to the service center, block 54. If the robot execution is continued to be outside allowed ranges, the monitoring component can order stop execution of the robot program, block 50.

In another case, the customer wants greater load. The customer sends a request to the service center for approval of increasing the load of the robot. This request is, for example, sent from the teach pendant unit by activating the help button and carrying out the request through the user interface displayed on the teach pendant unit. Alternatively, the customer may call the local representative of the service center who connects up to the robot via the communication line. Monitoring is established for the current motion and monitoring data is sent to the service center. The monitoring may be initialized by the service center upon receiving the request or by the controller upon sending the request to the service center. An evaluation is performed at the service center. An estimated load increase is calculated, and after approval new maximum permissible performance parameters, such as maximum torques, maximum allow-able accelerations, filter times and lengths, and S-curve parameters, are calculated based on the monitoring data and sent down to the robot controller.

A plurality of monitoring parameters are determined and sent to the monitoring component. During execution of the robot program, a monitoring component supervises the robot in order to ensure that the robot program is not modified outside the approved limit. The same sequence as described above in connection with improving the performance of the robot is followed, only a different combination of monitoring parameters is used. One or more additional monitoring parameter is added; a joint range for one or more of the axes of the robot. The restriction is added to at least one axis so that the torque due to gravity does not exceed the ability of the motor or brakes of the axis. If the robot has six axes, a restriction is typically added to the axes that contribute to the orientation of the axis five in the vertical plane. In a common vertically articulated robot these are axes two, three, and five. Monitoring is established in the same way as described above.

In the following, a detailed example of monitoring larger load is described. In this example the customer wants a larger payload on the robot. This can be achieved only if axis five of the robot is kept within +/−25 degrees of vertical downward. The request for larger load is sent to the service center, and the analyzing computer calculates the allowable ranges of axes two, three and five, which will keep the axis five pointed downward within 25 degrees. These ranges are sent to the monitoring component that sets up a check of axes two, three and five on periodic bases, for example this can be done from 1 to 500 times per second. If the axis are moved outside the allowable range, the monitoring component responds by stopping the robot and sends a message to the teach pendant unit, or another display device informing the user that the robot is run outside allowable ranges. The operator may decide to override the monitoring component and to continue the motion. If this is done, the monitoring component will send a record to the service center for further actions, which may result in a cancellation of the increased load allowance.

The present invention is not limited to the embodiments disclosed but may be varied and modified within the scope of the following claims. For example, monitoring data may be continuously sent from the robot controller to the remote service center prior to a request for more performance, load, or assistance as part of a general contract. Other parameters may also be changed, such as control parameters, filter times, lengths, and controller gains, curve profiles, and tuning parameters that affect the performance and cycle time. Performance may also be measured not only in cycle time but also in path accuracy. A performance request may be for more accuracy, resulting in a different set of controller parameters that are sent to the controller and monitored via the monitoring component. Further, the invention makes it possible for the customer to request more performance on the expense of a shorter lifetime of the robot. The remote service center will then let the customer choose a shorter lifetime and allow the customer a high performance.

The invention claimed is:

1. A robot service system comprising a robot including least one manipulator and a controller controlling the motion of the manipulator, the robot service system comprising:

a remote service center including an analyzing computer, a communication line between the robot controller and the remote service center, wherein the remote service center is adapted, upon request, to send new parameters to the robot controller and the robot controller is adapted to receive the parameters and to run the robot based on the new parameters, and a monitoring component configured to monitor the current operation of the controller and the current motions of the manipulator, and to transmit information on the current operation of the controller and the current motions of the manipulator to the remote service center, wherein said analyzing computer is configured, upon request, to calculate new maximum permissible performance parameters for the robot based on said received information and to transmit the new maximum permissible performance parameters to the robot controller, wherein said analyzing computer is further configured to calculate one or more monitoring parameters, and wherein said monitoring component is further configured to supervise that the robot is not run outside allowed limits based on said monitoring parameters.

2. The robot service system according to claim 1, wherein the manipulator is movable about a plurality of axes, and said maximum permissible performance parameters include maximum allowed motor torques for the axes of the manipulator.

3. The robot service system according to claim 2, wherein said analyzing computer is configured, upon a request for more performance, to calculate new maximum permissible performance parameters including maximum allowed gearbox torque, and maximum allowed stress on the mechanical structure of the manipulator.

4. The robot service system according to claim 3, wherein said analyzing computer is configured to receive a robot program from the robot controller, to perform an automatic analysis of the program with regard to increased performance, and based thereon calculate the new maximum permissible performance parameters.

5. The robot service system according to claim 4, wherein said analyzing computer is configured to calculate the monitoring parameter based on the program code of the program, and wherein the monitoring component is configured to supervise that the robot program is not modified or tampered with based on the monitoring parameter.

6. The robot service system according to claim 5, wherein one of said monitoring parameters is a checksum calculated based on the program code.

7. The robot service system according to claim 2, wherein said analyzing computer is configured, upon a request for more load, to calculate new maximum permissible performance parameters including maximum allowed gearbox torques.

8. The robot service system according to claim 1, wherein said analyzing computer is configured, upon a request for more load, to calculate a monitoring parameter in the form of an allowed joint range for one of the axes of the robot, and wherein the monitoring component is configured to supervise that the axis is not moved outside the allowed joint range.

9. The robot service system according to claim 1, further comprising:
a help component configured, upon activation, to provide a user interface to the remote service center.

10. The robot service system according to claim 9, wherein the help component comprises a help button, the robot service system further comprising:
a portable control unit including a display unit and said help component, wherein the help component is configured to show said user interface on the display unit and to connect the control unit to the remote service center upon activation of the help button.

11. A method for providing remote service for an industrial robot including least one manipulator and a controller controlling the motion of the manipulator, the method comprising:

receiving a request for improved operation of the robot,
transmitting information on the current operation of the controller and the current motions of the manipulator to a remote service center upon receiving the request,
calculating new maximum permissible performance parameters for the robot based on said information,
transmitting the new maximum permissible performance parameters to the robot controller,
calculating one or more monitoring parameters,
operating the robot based on the new maximum permissible performance parameters, and
supervising the robot such that the robot is not run outside allowed limits based on said monitoring parameters.

12. The method according to claim 11, wherein the manipulator is movable about a plurality of axes, and said maximum permissible performance parameters include maximum allowed motor torques for the axes of the manipulator.

13. The method according to claim 12, wherein a request for more performance is received and the new maximum permissible performance parameters include maximum allowed gearbox torque, and maximum allowed stress on the mechanical structure of the manipulator.

14. The method according to claim 11, further comprising:
analyzing a robot program with regard to increased performance, and based thereon calculating the new maximum permissible performance parameters.

15. The method according to claim 11, further comprising:
receiving a request for more performance,
receiving a robot program,
calculating a monitoring parameter based on the program code of a robot program, and
supervising the robot such that the robot program is not modified or tampered with based on the monitoring parameter.

16. The method according to claim 15, wherein said monitoring parameter comprises a checksum calculated based on the program code.

17. The method according to claim 12, further comprising:
receiving a request for more load is received, wherein the new maximum permissible performance parameters include new motion parameters.

18. The method according to claim 17, wherein at least one of said monitoring parameters is an allowed joint range for one of the axes of the robot, the method further comprising:
supervising the axis such that the axis is not moved outside the allowed joint range.

* * * * *

UNITED STATES PATENT AND TRADEMARK OFFICE
CERTIFICATE OF CORRECTION

PATENT NO.      : 8,099,191 B2
APPLICATION NO. : 12/330259
DATED           : January 17, 2012
INVENTOR(S)     : Dominique Blanc et al.

Page 1 of 1

It is certified that error appears in the above-identified patent and that said Letters Patent is hereby corrected as shown below:

Title page, item (75) change:

"(75)   Inventors: ... Steve Murphy, Hovåas (SE)"

to

--(75)   Inventors: ... Steve Murphy, Hovås (SE)--

Signed and Sealed this
Twelfth Day of February, 2013

Teresa Stanek Rea
*Acting Director of the United States Patent and Trademark Office*